United States Patent [19]

Shimizume et al.

[11] Patent Number: 5,265,081
[45] Date of Patent: Nov. 23, 1993

[54] DISC RECORDING/REPRODUCING APPARATUS HAVING TWO CONSTANT LINEAR VELOCITIES WITH CONTROLLED STEP SWITCHING BETWEEN THE TWO

[75] Inventors: Kazutoshi Shimizume, Kanagawa; Yoichiro Sako, Chiba, both of Japan

[73] Assignee: Sony Corporation, Tokyo, Japan

[21] Appl. No.: 708,170

[22] Filed: May 31, 1991

[30] Foreign Application Priority Data

Jun. 1, 1990 [JP] Japan ................... 2-144891

[51] Int. Cl.[5] .................. G11B 27/10; H03L 7/08
[52] U.S. Cl. ........................... 369/48; 369/50; 369/58; 360/10.1; 360/27; 360/73.03; 358/337; 358/342; 307/271
[58] Field of Search .............. 369/47, 48, 50, 58; 360/73.03, 10.1, 27; 358/337, 342; 307/271

[56] References Cited

U.S. PATENT DOCUMENTS

| | | | |
|---|---|---|---|
| 4,353,089 | 10/1982 | Winslow et al. | 369/48 |
| 4,959,825 | 9/1990 | Okano | 369/48 |
| 4,984,227 | 1/1991 | Yoshimaru | 369/50 |
| 5,134,500 | 7/1992 | Tobe | 369/48 |

*Primary Examiner*—John S. Heyman
*Attorney, Agent, or Firm*—Lewis H. Eslinger; Jay H. Maioli

[57] ABSTRACT

A disc reproducing apparatus comprises a reference frequency generating circuit that generates a reference frequency signal. The frequency of the reference frequency signal from the reference frequency generating circuit is varied whereby a disc is reproduced at both a first and a second constant linear velocity, the second velocity being higher than the first. The improvement over the prior art is that the frequency of the reference frequency signal is varied gradually in steps upon switching from the first constant linear velocity to the second constant linear velocity.

4 Claims, 2 Drawing Sheets

DISC RECORDING/REPRODUCING APPARATUS HAVING TWO CONSTANT LINEAR VELOCITIES WITH CONTROLLED STEP SWITCHING BETWEEN THE TWO

BACKGROUND OF THE INVENTION

1. Field of the Invention

The present invention relates to a disc reproducing apparatus suitable for use as a CD-ROM player as well as to a magnetic disc recording/reproducing apparatus.

2. Description of the Prior Art

Today, typical CD-ROM players have a constant linear velocity of 1.2 to 1.4 m/s and a reproduction data rate of 1.8816 Mb/s. However, the reproduction data rate of 1.8816 Mb/s of the CD-ROM player is not high enough to record animation data and the like adequately. What is needed is to raise the reproduction data rate without changing the pit lengths on the compact disc serving as the CD-ROM. If the linear velocity of the CD-ROM compact disc is doubled to 2.4 to 2.8 m/s, the data rate is also doubled. One way to implement this is to have the compact disc comprise two areas of different data rates: one having a reproduction data rate of 3.7632 Mb/s (i.e., double the normal rate) for animation data and the like, the other having the normal data rate. The revolutions of the spindle that rotates the compact disc are controlled according to the area so that the line velocity is changed where needed. This scheme makes it possible to retrieve from the compact disc the data such as animation data to be reproduced at the higher bit rate.

One disadvantage of the above-described scheme is that when the line velocity is changed so as to alter the reproduction data rate, the data cannot thereupon be reproduced until after the servo mechanism is stabilized.

OBJECTS AND SUMMARY OF THE INVENTION

In view of the above-described deficiencies of the prior art, the present invention envisages providing a disc reproducing apparatus which is suitable for use as a CD-ROM (compact disc read-only memory) player and in which a reference frequency generating circuit generates a reference frequency signal whose frequency is changed so that the compact disc is reproduced both at a first constant linear velocity and at a second constant linear velocity higher than the first, wherein the frequency of the reference frequency signal generated by the reference frequency generating circuit is changed in a stepped manner when the first constant linear velocity is replaced by the second constant linear velocity, the stepped frequency change allowing data to be reproduced from either of two areas on the compact disc, the two areas being associated with different reproduction data rates.

It is therefore an object of the present invention to provide a disc recording/reproduction apparatus capable of changing the reproduction data rates thereof upon data reproduction to reproduce from the compact disc the data of different reproduction data rates.

DESCRIPTION OF THE PREFERRED EMBODIMENTS

One preferred embodiment of the present invention will now be described with reference to the accompanying drawings.

Figure 1:
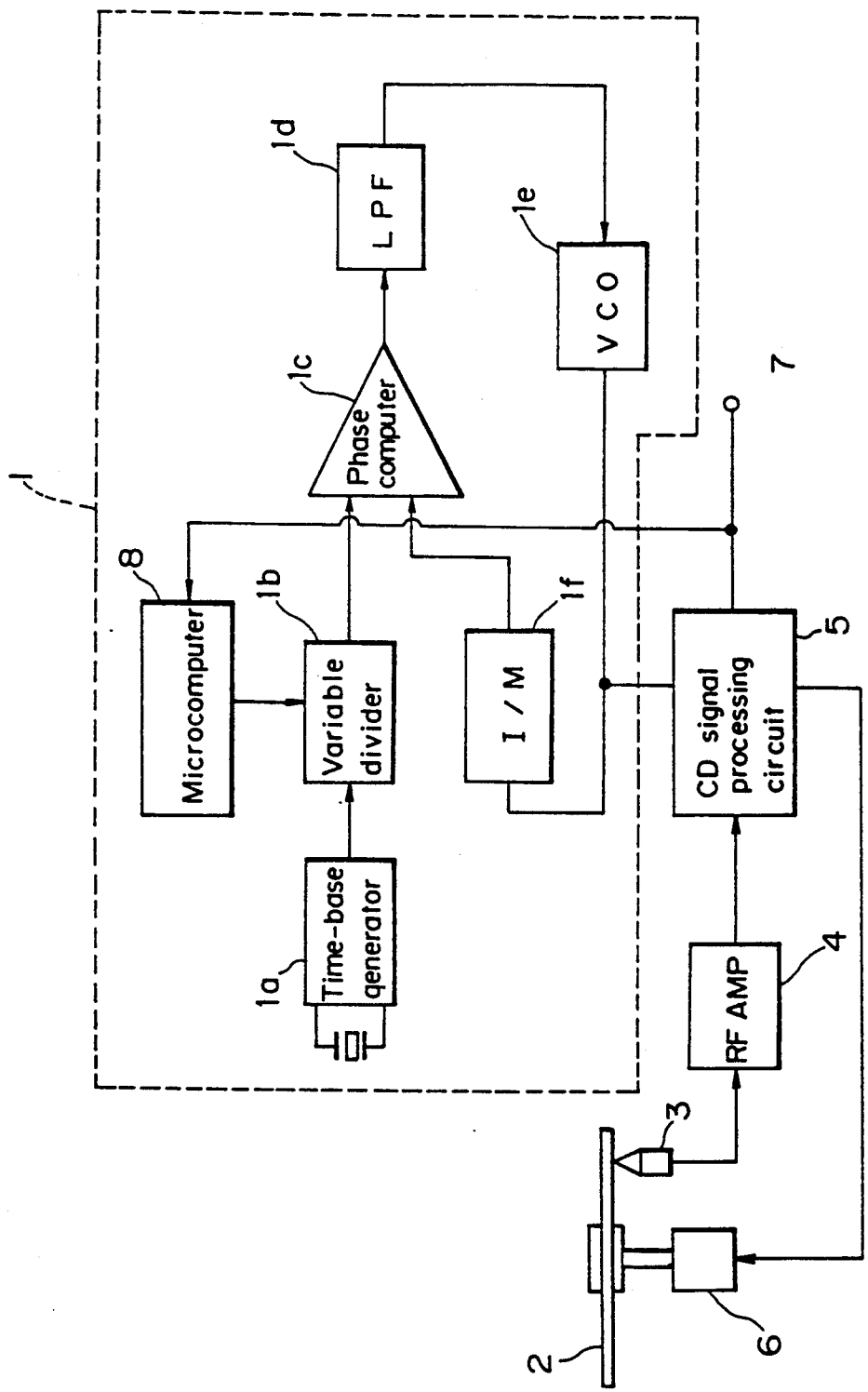
FIG. 1 is a block diagram of a disc reproducing apparatus embodying the present invention.

Referring to FIG. 1, reference numeral 2 is a compact disc constituting a CD-ROM. The compact disc 2 contains data recorded with the same pit lengths as those of conventional audio compact discs. The beginning of each data portion has a linear velocity designation signal recorded. For example, an animation data portion is prefixed with a linear velocity designation signal S2 that requires doubling the normal linear velocity to 2.4 m/s through 2.8 m/s so that the normal reproduction data rate is doubled to 3.7632 Mb/s; a normal data portion for the data of the normal reproduction data rate of 1.8816 Mb/s is headed with a linear velocity designation signal S1 that specifies the normal linear velocity of 1.2 m/s to 1.4 m/s.

With the embodiment of FIG. 1, the pit data recorded on the compact disc 2 is reproduced by an optical head 3. The reproduced signal from the optical head 3 is fed to a compact disc (CD) signal processing circuit 5 via a radio frequency amplifier 4. The CD signal processing circuit 5 is supplied with a reference clock signal from an analog PLL circuit constituting a reference frequency generating circuit 1. A digital PLL circuit is provided to generate a clock signal synchronous with an EFM signal (eight-fourteen modulation signal) of the reproduced signal. The clock signal from the digital PLL circuit is used to effect synchronous detection digital signal processing for data reproduction. At the same time, a servo signal is provided to maintain the revolutions of the compact disc 2 at a constant linear velocity. This servo signal is supplied to a spindle motor 6 that rotates the compact disc 2. Reference numeral 7 is an output terminal from which reproduced data is obtained.

In this embodiment, the analog PLL circuit that constitutes the reference frequency generating circuit 1 generating the reference clock signal is constructed as follows: A time-base generator 1a is made of a crystal oscillator whose oscillation frequency is illustratively 16.9344 MHz. The oscillation signal from the time-base generator 1a is supplied to one of the two input terminals of a phase comparator 1c via a variable divider 1b. The dividing ratio (1/N) of the variable divider 1b is determined by a control signal from a microcomputer 8. In this setup, the microcomputer 8 judges the linear velocity designation signal to be either S1 or S2 for the applicable reproduction mode in accordance with the reproduced data appearing on the output side of the CD signal processing circuit 5. If the linear velocity designation signal is S1 for normal reproduction mode, the dividing ratio (1/N) is illustratively set for 1/24; if the linear velocity designation signal is S2 for double linear velocity reproduction mode, the dividing ratio (1/N) is illustratively set for 1/12.

If the linear velocity is changed from 1.2–1.4 m/s for normal mode to 2.4–2.8 m/s for double velocity mode or vice versa in the embodiment, the microcomputer 8 uses reproduced data to detect the linear velocity change on the compact disc 2, and accordingly controls the dividing ratio (1/N) of the variable divider 1b so that the linear velocity is changed in 0.1% steps. The 0.1% step change is adopted so that the analog PLL circuit constituting the reference frequency generating circuit 1 will remain locked. Other steps may be utilized as long as the analog PLL circuit is held locked.

The output of the phase comparator 1c is fed to a voltage-controlled oscillator 1e via a low-pass filter 1d. In this setup, the oscillation frequency of the voltage-controlled oscillator 1e is set for 34.5744 MHz for normal reproduction mode and 69.1488 MHz for double linear velocity reproduction mode. The oscillation signal from the voltage-controlled oscillator 1e is sent to the other output terminal of the phase comparator 1e via a divider 1f having a dividing ratio (1/M) of, say, 1/49. The output signal from the voltage-controlled oscillator 1e is supplied as the reference clock signal to the digital PLL circuit incorporated in the CD signal processing circuit 5.

The reference clock signal from the voltage-controlled oscillator 1e of the reference frequency generating circuit 1 is used as the reference signal for the servo signal of the spindle motor 6 that keeps the linear velocity of the compact disc 2 constant. That is, the frequency of the reference clock signal determines the linear velocity of the compact disc 2. The remaining parts of the apparatus are constructed in the same manner as in conventional CD-ROM players.

Figure 2:
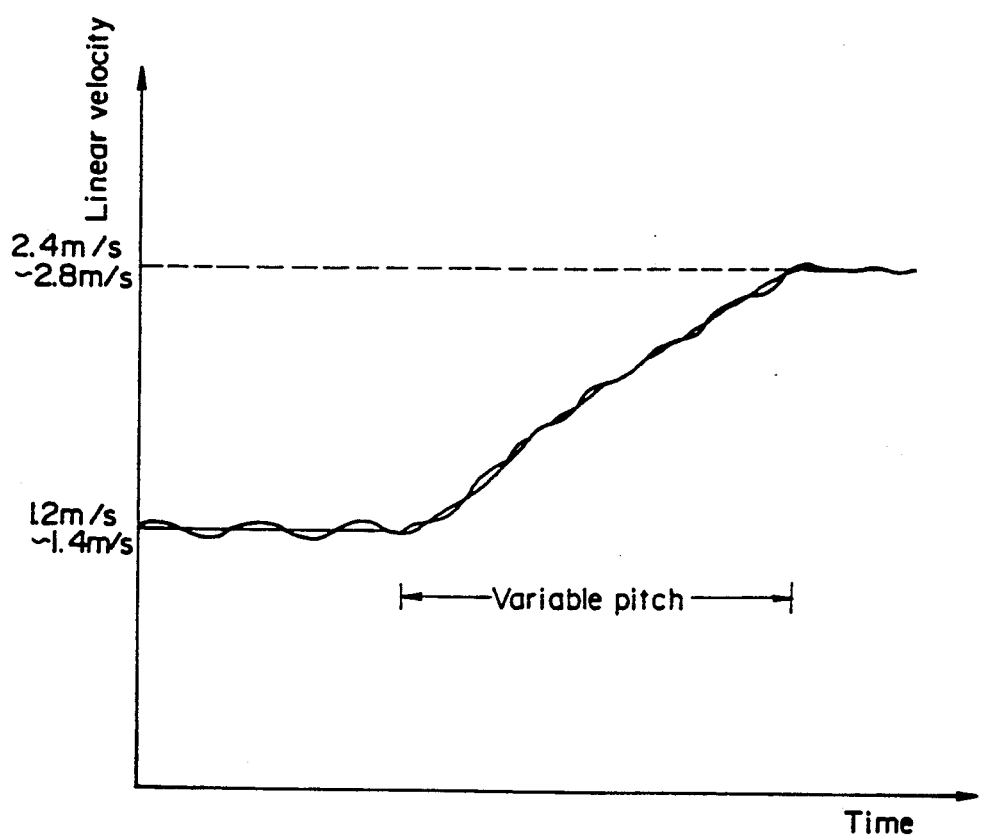
FIG. 2 is a view illustrating the linear velocity versus time characteristic regarding disc revolutions in the embodiment of FIG. 1.

With this embodiment, if the data recorded on the compact disc 2 is found to be one which requires the normal reproduction data rate of, say, 1.8816 Mb/s, the microcomputer 8 uses the reproduced data to determine the linear velocity designation signal S1 for normal mode, thereby setting the dividing ratio (1/N) of the variable divider 1b for 1/24 and setting the frequency of the reference clock signal from the circuit 1 for, say, 34.5744 MHz. These settings allow the spindle motor 6 to maintain the linear velocity of the compact disc 2 at a constant 1.2–1.4 m/s. If the data recorded on the compact disc 2 is found to be one which requires the double reproduction data rate of, say, 3.7632 Mb/s (e.g., animation data), the microcomputer 8 uses the reproduced data to determine the linear velocity designation signal S2 for double linear velocity reproduction mode, thereby setting the dividing ratio (1/N) of the variable divider 1b for 1/12 and setting the frequency of the reference clock signal from the circuit 1 for, say, 69.1488 MHz. These settings allow the spindle motor 6 to maintain the linear velocity of the compact disc 2 at a constant 2.4–2.8 m/s, which is double the normal velocity. In this manner, the embodiment raises the reproduction data rate high enough to acquire animation data and the like from the CD-ROM. Furthermore, when switching the linear velocity from 1.2–1.4 m/s for normal reproduction to 2.4–2.8 m/s for double velocity reproduction or vice versa, the embodiment gets the variable divider 1b to vary the dividing ratio (1/N) in 0.1% steps (variable pitch) as depicted in FIG. 2. This allows the analog PLL circuit constituting the reference frequency generating circuit 1 to stay locked. That is, data reproduction remains stable even when the reproduction data rate is changed.

Although the invention as embodied above is applied to the compact disc reproducing apparatus, this embodiment is not limitative of the invention. The invention may also be applied where other kinds of disc are reproduced. The above-described embodiment utilizes the variable divider 1b whose dividing ratio (1/N) is varied by the microcomputer 8. Alternatively, the other divider 1f may be replaced with a variable divider whose dividing ratio (1/M) may be varied by the microcomputer 8.

Other changes and variations of the invention may also be made. For example, whereas FIGS. 1 and 2 illustrate the structure of the representative CD-ROM player embodying the invention and the characteristics thereof, the invention may be practiced in another variation. This variation, with reference to FIG. 1, may be constructed as follows: The compact disc 2 is replaced with a magnetic disc 2' for storing data; the optical head 3 that optically detects pit length data from the compact disc 2 is replaced with a recording/reproducing magnetic head 3' for picking up magnetic data from the magnetic disc 2'; and the radio frequency amplifier 4 is alternatively constituted by two recording/reproducing amplifiers 4'. One of the recording/reproducing amplifiers 4' takes a feebly reproduced analog signal from the magnetic head 3' and amplifies it into a digital waveform signal. The other recording/reproducing amplifier 4' amplifies a recording signal to be recorded onto the magnetic disc 2' via the magnetic head 3'. In addition, the CD signal processing circuit 5 is replaced with a signal processing circuit 5' offering two functions: one for digitally processing the signal from the recording-/reproducing amplifier 4', and the other for generating a write signal to be supplied to the recording/reproducing amplifier 4'.

The reference frequency generating circuit 1 may be used unchanged in the above variation. The spindle motor 6 may also be used unmodified to control the revolutions of the magnetic disc 2' in accordance with the control signal from the signal processing circuit 5'.

In this manner, some of the circuit blocks of the CD-ROM player may be suitably modified to implement a magnetic disc recording/reproducing apparatus embodying the present invention.

As described and according to the invention, the frequency of the reference frequency signal generated by the reference frequency generating circuit is varied in such a manner that the linear velocity of the disc is changed gradually in steps for reproduction data rate change. The scheme ensures that the PLL circuit constituting the reference frequency generating circuit remains locked. This in turn keeps data reproduction from the disc stable when the reproduction data rate is changed.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A disc apparatus comprising:
   a recording/reproducing head for picking up data stored on a rotating disc;
   a radio frequency amplifier for amplifying a reproduced signal coming from said recording/reproducing head;
   means for generating a clock signal;
   a signal processing circuit for receiving the output signal of said radio frequency amplifier, processing said output signal using said clock signal, and outputting the result thereof;

a microcomputer for judging the linear velocity of said disc as it rotates, said microcomputer performing said judging based on reproduced data retrieved from the output signal from said signal processing circuit and generating a control signal;

a reference signal generating circuit;

a first divider, of which the driving ratio is variable, for driving by a desired ratio a signal from said reference signal generating circuit in accordance with said control signal from said microcomputer;

a second divider;

a phase comparator for receiving both the divided signal from said first variable divider and an output signal from said second divider, said phase comparator detecting a phase difference between said divided signal and said output signal from said second divider;

a low-pass filter;

a voltage-controlled oscillator for receiving the output signal from said phase comparator as a DC signal via said low-pass filter, said voltage-controlled oscillator supplying both said second divider and said signal processing circuit with a signal corresponding to said DC signal; and a spindle motor for controlling the linear velocity of said disc as it rotates in accordance with the output signal from said signal processing circuit.

2. A disc apparatus according to claim 1 wherein the dividing ratio of said first variable divider is varied in 0.1% steps.

3. A disc apparatus comprising:

a recording/reproducing head for picking up data stored on a rotating disc;

a radio frequency amplifier for amplifying a reproduced signal coming from said recording/reproducing head;

means for generating a clock signal;

a signal processing circuit for receiving the output signal of said radio frequency amplifier, processing said output signal using said clock signal, and outputting the result thereof;

a microcomputer for judging the linear velocity of said disc as it rotates, said microcomputer performing said judging based on reproduced data retrieved from the output signal from said signal processing circuit and generating a control signal;

a first divider for dividing by a predetermined ratio a signal from a reference signal generating circuit;

a second divider having a dividing ratio that is variable;

a phase comparator for receiving both the divided signal from said first divider and an output signal from said second divider whose dividing ratio is variable, said output signal from said second divider being divided by a desired ratio in accordance with said control signal from said microcomputer, said phase comparator detecting a phase difference between the two divided signals;

a low-pass filter;

a voltage-controlled oscillator for receiving the output signal from said phase comparator as a DC signal via said low-pass filter, said voltage-controlled oscillator supplying both said second divider and said signal processing circuit with a signal corresponding to said DC signal; and a spindle motor for controlling the linear velocity of said disc as it rotates in accordance with the output signal from said signal processing circuit.

4. A disc apparatus according to claim 3 wherein the dividing ratio of said second variable divider is varied in 0.1% steps.

* * * * *